United States Patent
Kolandavelu et al.

(10) Patent No.: US 9,245,306 B2
(45) Date of Patent: Jan. 26, 2016

(54) METHODS AND APPARATUS FOR GENERATING AND ACCESSING INFORMATION IN BINARY FILES

(75) Inventors: Raghupathy Kolandavelu, TamilNadu (IN); Selvakumar Chellappan, Karnataka (IN); Tim Felke, Glendale, AZ (US); MoghanaPriya Kesavan, Karnataka (IN); Murali Kadeppagari, Karnataka (IN); Rajesh Ethiraj, Karnataka (IN)

(73) Assignee: HONEYWELL INTERNATIONAL INC., Morris Plains ( * ) Notice: Subject to any disclaimer, the term of this patent is extended or adjusted under 35 U.S.C. 154(b) by 1374 days.

(21) Appl. No.: 12/825,070

(22) Filed: Jun. 28, 2010

(65) Prior Publication Data
US 2011/0320086 A1    Dec. 29, 2011

(51) Int. Cl.
G06F 17/30 (2006.01)
G06F 19/00 (2011.01)
G06Q 10/00 (2012.01)
G06Q 50/30 (2012.01)

(52) U.S. Cl.
CPC ............... *G06Q 50/30* (2013.01); *G06Q 10/20* (2013.01)

(58) Field of Classification Search
CPC ..................................................... G05B 23/00
USPC ............ 701/29.3, 29.4, 34.2; 705/2; 340/945, 340/963
See application file for complete search history.

(56) References Cited

U.S. PATENT DOCUMENTS

| | | | | |
|---|---|---|---|---|
| 6,662,089 B2 * | 12/2003 | Felke | ................. | G05B 23/0278 340/945 |
| 7,050,894 B2 * | 5/2006 | Halm | ..................... | B64D 47/00 701/29.4 |
| 7,131,110 B2 * | 10/2006 | Brewin | ..................... | G06F 8/51 712/E9.082 |
| 7,289,997 B1 * | 10/2007 | Kita | .................. | G06F 17/30607 |
| 7,349,960 B1 * | 3/2008 | Pothier | ............. | G06F 17/30539 709/223 |
| 7,418,456 B2 * | 8/2008 | Charlet | ............. | G06F 17/30595 |
| 7,487,059 B2 * | 2/2009 | Davis | ........................ | B06B 1/06 702/116 |
| 7,720,626 B2 * | 5/2010 | Mathews | ........... | G05B 23/0256 600/544 |
| 8,401,021 B2 * | 3/2013 | Buga | .................. | H04B 7/18506 370/395.42 |
| 2003/0167111 A1 * | 9/2003 | Kipersztok | ........ | G05B 23/0278 702/185 |
| 2003/0195675 A1 * | 10/2003 | Felke | ................. | G05B 23/0278 701/29.3 |
| 2004/0162651 A1 * | 8/2004 | Halm | ..................... | B64D 47/00 701/29.4 |
| 2006/0161354 A1 | 7/2006 | Mandema et al. | | |
| 2006/0200258 A1 * | 9/2006 | Hoffberg | ............... | G05B 15/02 700/86 |
| 2010/0036676 A1 * | 2/2010 | Safdi et al. | ........................ | 705/2 |
| 2010/0114941 A1 * | 5/2010 | Von Kaenel | ...... | G06F 17/30241 707/769 |
| 2011/0320086 A1 * | 12/2011 | Kolandavelu | .......... | G06Q 10/20 701/34.2 |

* cited by examiner

Primary Examiner — Thomas G Black
Assistant Examiner — Wae Louie
(74) Attorney, Agent, or Firm — Ingrassia Fisher & Lorenz, P.C.

(57) ABSTRACT

An embodiment of a method for generating a binary file includes receiving information defining an entity that forms a portion of loadable diagnostics information, generating metadata defining a location within a binary file where the entity is to be located, and generating the binary file to include the metadata and the entity stored at the location. Additional embodiments include an aircraft diagnostic system and a method for the diagnostics system to access information within a binary file. The diagnostics system includes data storage and an accessor module. The data storage is configured to store the binary file, which includes metadata and an entity stored at a location within the binary file, where the metadata defines the location of the entity. The accessor module is configured to evaluate the metadata to make a determination of the location, and to access the entity within the binary file based on the determination.

18 Claims, 3 Drawing Sheets

METHODS AND APPARATUS FOR GENERATING AND ACCESSING INFORMATION IN BINARY FILES

TECHNICAL FIELD

The embodiments generally relate to generating and accessing information in binary files, and more specifically relate to generating and accessing loadable diagnostics information represented in binary files for use by aircraft diagnostics systems.

BACKGROUND

During operations of an aircraft, an onboard diagnostics system collects diagnostics data reflecting the aircraft's performance, operational variables, and operational incidents. The collected diagnostics data may be evaluated by the diagnostics system in order to detect potential faults with the aircraft's systems and components, for example. In some cases, the diagnostics system accesses loadable diagnostics information ("LDI") in conjunction with evaluating the collected diagnostics data. The LDI may be represented in a binary file, for example, which includes an entity-relationship model relating to various system components. For example, the entity-relationship model may include entities associated with various aircraft components, information defining the relationships between the entities, and attributes of the entities and relationships. To evaluate the aircraft's operation, the diagnostics system applies the collected diagnostics data to the entity-relationship model defined in the LDI.

Typically, a ground-based binary converter tool generates the LDI file, and the LDI file is thereafter loaded into diagnostics system accessible memory prior to aircraft operations. The binary converter tool is constrained to arrange the various entities within the LDI file according to a predetermined binary file structure, and the onboard diagnostics system has a priori knowledge of the predetermined structure. More particularly, the onboard diagnostics system may include an LDI accessor module, and the structure of the LDI file is embedded (e.g., hardcoded) in the LDI accessor module code. This enables the LDI accessor module to calculate the position of each entity within the LDI file, in order to facilitate access by the LDI accessor module to each entity during aircraft operations.

Using traditional techniques, whenever a change is implemented in the structure of an entity-relationship model defined in an LDI file, the embedded LDI file structure information in the LDI accessor module also must be updated. An LDI accessor module typically is a qualified tool in an aircraft, however. Accordingly, updates to the LDI accessor module's embedded software requires a requalification process to be performed. Requalification of aircraft components and systems are time consuming and expensive processes. Accordingly, relatively long delays are inherent in implementing LDI file structure changes (e.g., entity-relationship model changes) using traditional techniques. In addition, even after requalification is completed, the embedded software must be updated in the LDI accessor module of each aircraft in which the newly structured LDI files are to be used. Accordingly, significant time and expense is associated with implementing LDI file structure changes, particularly when extensive aircraft fleets are to be updated. Because LDI file structure changes may be implemented at least several times during the operational life of an aircraft, what are needed are more efficient methods and apparatus to enable LDI file structure changes to be rapidly and inexpensively implemented in conjunction with aircraft diagnostics systems.

BRIEF SUMMARY

An embodiment includes a method for generating a binary file. The method includes receiving information defining an entity that forms a portion of loadable diagnostics information, generating metadata defining a location within a binary file where the entity is to be located, and generating the binary file to include the metadata and the entity stored at the location.

Another embodiment includes a method for an aircraft diagnostics system to access information within a binary file. The method includes evaluating metadata within the binary file to determine a location of an entity within the binary file, and accessing the entity within the binary file based on the location determined during the evaluating step.

Yet another embodiment includes a diagnostics system of an aircraft, which includes data storage and an accessor module. The data storage is configured to store a binary file that includes metadata and an entity stored at a location within the binary file, where the metadata defines the location of the entity. The accessor module is configured to evaluate the metadata to make a determination of the location, and to access the entity within the binary file based on the determination.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Although embodiments of the inventive subject matter that are implemented in aircraft-based diagnostics systems are described in detail below, it is to be understood that embodiments may be implemented in various types of diagnostics systems and/or apparatus. In addition, embodiments may be implemented in systems and/or apparatus (other than diagnostics systems) that access binary files that include entity-relationship models having known structures. These various types of systems and/or apparatus include, but are not limited to, systems implemented in aircraft, spacecraft, motor vehicles, water vessels, other types of vehicles and vessels, robotic systems, hardware system control and monitoring systems (e.g., for manufacturing, energy production, mining, construction, and so on), computer system control and monitoring systems, and network control and monitoring systems, among other things. Accordingly, references herein to aircraft-based systems and/or diagnostics systems are not intended to be limiting. Those of skill in the art will understand, based on the description herein, that other embodiments may be implemented in various other types of systems.

According to a specific embodiment, an aircraft includes an onboard diagnostics system configured to collect diagnostics data during aircraft operations. In addition, the onboard diagnostics system is configured to access loadable diagnostic information ("LDI") during the process of evaluating the collected diagnostics data. The LDI may define an entity-relationship model represented in an LDI file (e.g., a binary file), in an embodiment. Accordingly, the LDI file contains various entities, their relationships to each other, and attributes of the entities and relationships. As used herein, the term "entity" means a distinctly definable object, and each entity includes a set of uniquely identifying attributes (e.g., a primary key). For example, entities may include various aircraft system components (e.g., line replaceable units and/or other components), in an embodiment. Embodiments of the inventive subject matter include LDI files that include both LDI content (e.g., entity-relationship models) and information defining the structure of the LDI content (e.g., the layout and sizes of the entities and relationships in the models). In addition, embodiments include methods and apparatus for generating and accessing such LDI files.

Figure 1:
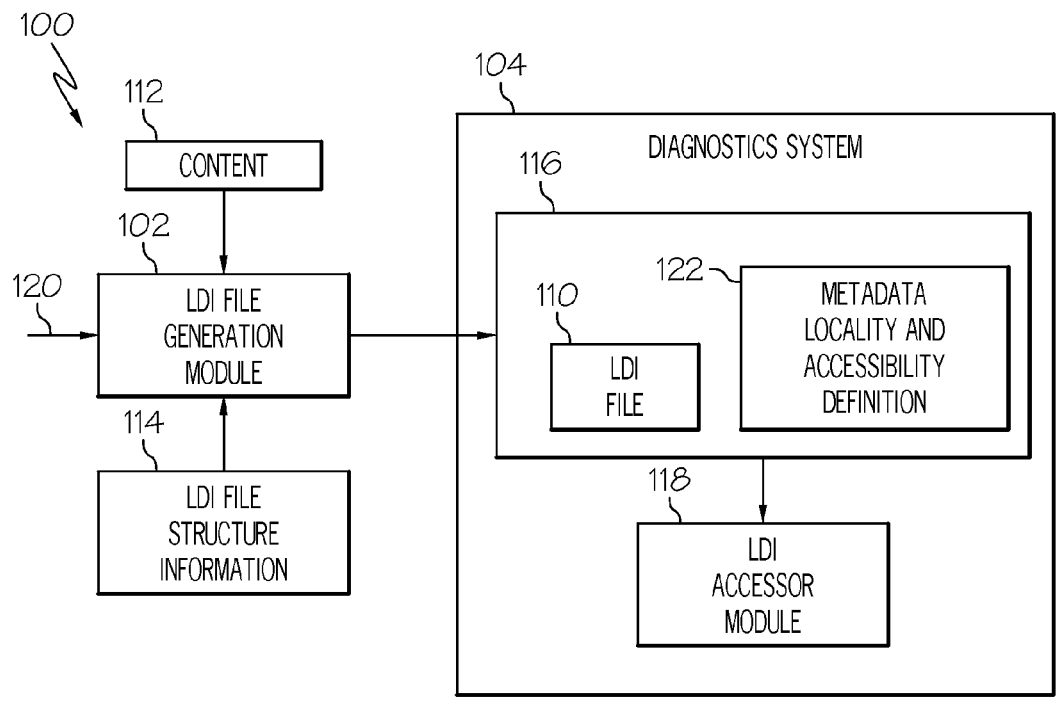
FIG. 1 illustrates a system for generating and accessing loadable diagnostics information ("LDI") files that are formatted in accordance with an example embodiment.

FIG. 1 illustrates a system 100 for generating and accessing LDI files (e.g., LDI file 110) that are structured in accordance with an example embodiment. System 100 includes an LDI file generation module 102 (e.g., a binary converter tool) and a diagnostics system 104. Diagnostics system 104 may be located onboard an aircraft (not illustrated), for example. Alternatively, diagnostics system 104 may include one or more ground based components, and/or may be an entirely ground based system.

LDI file generation module 102 generates an LDI file 110 from LDI content 112 and LDI file structure information 114 that is accessible to the LDI file generation module 102. During generation of the LDI file 110, the LDI file generation module 102 arranges entities derived from the LDI content 112 (or "content") within the LDI file 110 according to entity placement information specified in the LDI file structure information 114. In addition, the LDI file generation module 102 derives metadata (herein "LDI file structure metadata") that reflects the placement of the entities within the LDI file 110 from the LDI file structure information 114, and the LDI file generation module 102 embeds that metadata within the LDI file 110. Accordingly, the LDI file 110 includes content derived from the LDI content 112 and LDI file structure metadata derived from the LDI file structure information 114. The LDI content 112 may include, but is not limited to, entities that model various system components (e.g., models of various line replaceable units and other aircraft components).

Figure 2:
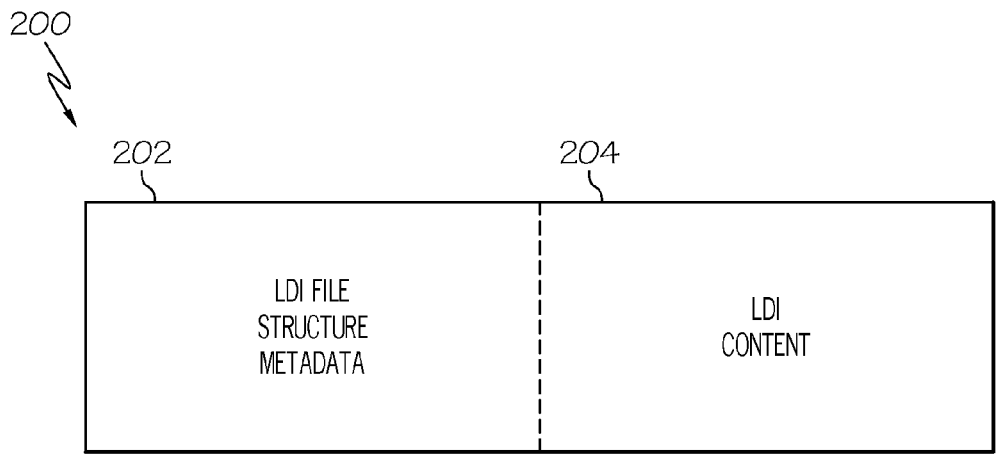
FIG. 2 illustrates an example of the structure of an LDI file that includes embedded LDI file structure metadata, in accordance with an example embodiment.

FIG. 2 illustrates an example of an LDI file 200 that includes embedded LDI file structure metadata (also referred to herein as "LDI metadata") and LDI content, in accordance with an example embodiment. In a particular embodiment, LDI file 200 includes at least two partitions: a first partition 202 that includes the LDI metadata; and a second partition 204 that includes the LDI content (e.g., various LDI entities). The structure of the LDI content in the second partition 204 is defined in the LDI metadata in the first partition 202.

Although LDI file 200 includes a single partition for LDI metadata and a single partition for LDI content, other embodiments contemplate LDI files that include more than one partition for LDI metadata and/or more than one partition for LDI content. In addition, the relative arrangement of the partitions 202, 204 may be different from that shown in FIG. 2, in another embodiment.

Prior to generation of the binary file, the information within LDI file 200 may be represented in an XML (eXtensible Markup Language) format, for example, although it alternatively may be represented in another format. In the embodiment depicted in FIG. 2, the LDI metadata and the LDI content are represented within a single LDI file 200. In an alternate embodiment, the LDI file structure information (e.g., the LDI metadata) is represented separately and distinctly from the LDI content within the LDI file. In other words, the LDI content and the LDI metadata may be represented in distinct files. In such an embodiment, the LDI file generation module 102 generates both an LDI file (e.g., LDI file 110), which includes only LDI content, and an LDI metadata file (not illustrated), which includes the LDI file structure information. After the LDI content and LDI metadata files have been loaded into the diagnostics system 104, the LDI accessor module 118 may evaluate the LDI metadata within the LDI metadata file to determine how to access the various entities within the LDI content file.

Referring again to FIG. 1, once the LDI file 110 is created by the LDI file generation module 102, the LDI file 110 may be made accessible to the onboard diagnostics system 104. Diagnostics system 104 includes an LDI accessor module 118 that is configured to access the content within the LDI file 110. In contrast with prior systems, the structure of the content (e.g., the locations of the various entities and/or their relations to each other) of the LDI file 110 may not be known, a priori, to the diagnostics system 104 or to the LDI accessor module 118. In other words, according to various embodiments, neither the diagnostics system 104 nor the LDI accessor module 118 is required to include embedded LDI file structure information in order to determine the structure of the content within the LDI file 110, as is done in prior systems. Instead, the structure of the content within the LDI file 110 is represented in the metadata that is embedded within the LDI file 110.

According to an embodiment, the LDI metadata in the LDI file 110 is formatted in a manner that is specified by the LDI file generation module 102 and known, a priori, to the diagnostics system 104. In an embodiment, a metadata locality and accessibility definition 122 may be stored within the onboard memory 116 or hardcoded (e.g., embedded) in the LDI accessor module 118. The metadata locality and accessibility definition 122 may include, for example, "locality information" defining the location within any given LDI file (e.g., LDI file 110) of the LDI metadata and "accessibility information" defining the LDI metadata structure (i.e., information indicating how the metadata may be accessed). The metadata locality and accessibility definition 122 also may include other information that enables the LDI accessor module 118 to access and interpret the LDI metadata within the LDI file. Accordingly, the metadata locality and accessibility definition 122 enables the diagnostics system 104 (or more particularly the LDI accessor module 118) readily to interpret the LDI metadata (within the LDI file 110) in order to determine the structure of the LDI content within the LDI file 110. In other words, using the LDI metadata within a metadata partition of the LDI file 110 (e.g., partition 202, FIG. 2), the LDI accessor module 118 may determine the absolute and/or relative locations of the various entities and relationships within an LDI content partition of the LDI file 110 (e.g., partition 204, FIG. 2). The LDI metadata also may include information regarding the sizes of the various entities, among other things.

At times, it may be desirable to change the structure (or "schema") of the LDI content represented within an LDI file. In order to implement an LDI content structure change, the LDI file generation module 102 may receive an LDI content structure change request 120 (e.g., from a host system, not illustrated). The LDI content structure change request 120 includes information defining a new structure for the content (e.g., the entities, relationships, and attributes) within any LDI file to be generated by the LDI file generation module 102, or information indicating a change to a previous structure. For example, a new structure may include one or more additional entities/relationships/attributes, fewer entities/relationships/attributes, changes to the sizes of one or more entities/relationships/attributes, and/or changes to the locations or arrangements of the entities/relationships/attributes, among other changes. In an embodiment, the LDI file generation module 102 uses the information in the LDI content structure change request 120 to generate new LDI metadata in the known metadata format. In other words, the format of the LDI metadata is not changed in response to a LDI content structure change request 120, although the content of the LDI metadata may be changed to reflect the structure of the LDI content that is represented by the LDI metadata. In an embodiment, the LDI file generation module 102 may thereafter combine the new LDI metadata (e.g., in partition 202, FIG. 2) with the differently structured LDI content (e.g., in partition 204, FIG. 2) to generate an LDI file 110 that reflects the requested LDI content structure change.

Figure 3:
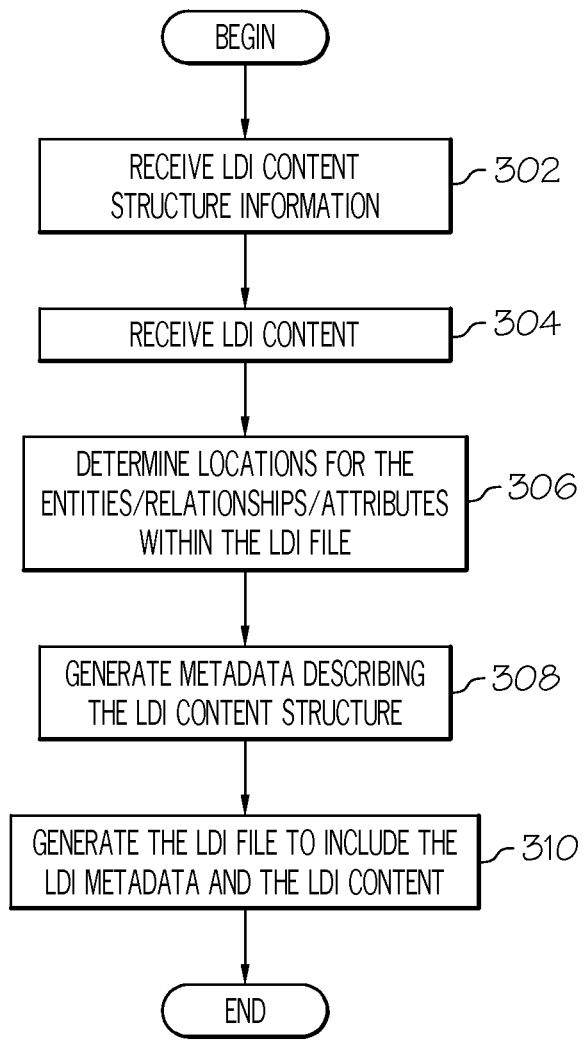
FIG. 3 illustrates a flowchart of a method for an LDI file generation module to generate an LDI file, in accordance with an example embodiment.

FIG. 3 illustrates a flowchart of a method for an LDI file generation module (e.g., module 102, FIG. 1) to generate an LDI file (e.g., LDI file 110, FIG. 1), in accordance with an example embodiment. The method may begin, in block 302, by receiving LDI content structure information (e.g., in the form of an LDI content structure change request 120, FIG. 1), which defines the structure that the LDI file generation module is to impose on the LDI content when generating the LDI file. In block 304, the LDI content is received for inclusion in the LDI file. For example, the LDI content may include one or more entity-relationship models corresponding to various aircraft system components (e.g., line replaceable units and other components).

In block 306, the LDI file generation module determines locations, within the LDI file, for the various entities, relationships, and attributes that are included within the LDI content. Determination of the various locations is constrained by the LDI content structure information. In block 308, the LDI file generation module generates LDI metadata describing the locations for the various entities, relationships, and attributes. The LDI metadata is generated in a manner that is consistent with the metadata locality and accessibility definition (e.g., definition 122, FIG. 1) that is known a priori to each LDI accessor module (e.g., LDI accessor module 118, FIG. 1) that will access and interpret the metadata. Finally, in block 310, the LDI file generation module generates the LDI file (e.g., a binary file) with the LDI metadata and the LDI content. Again, the LDI metadata is positioned in the LDI file in a manner that is consistent with the metadata locality and accessibility definition. The method then ends.

Figure 4:
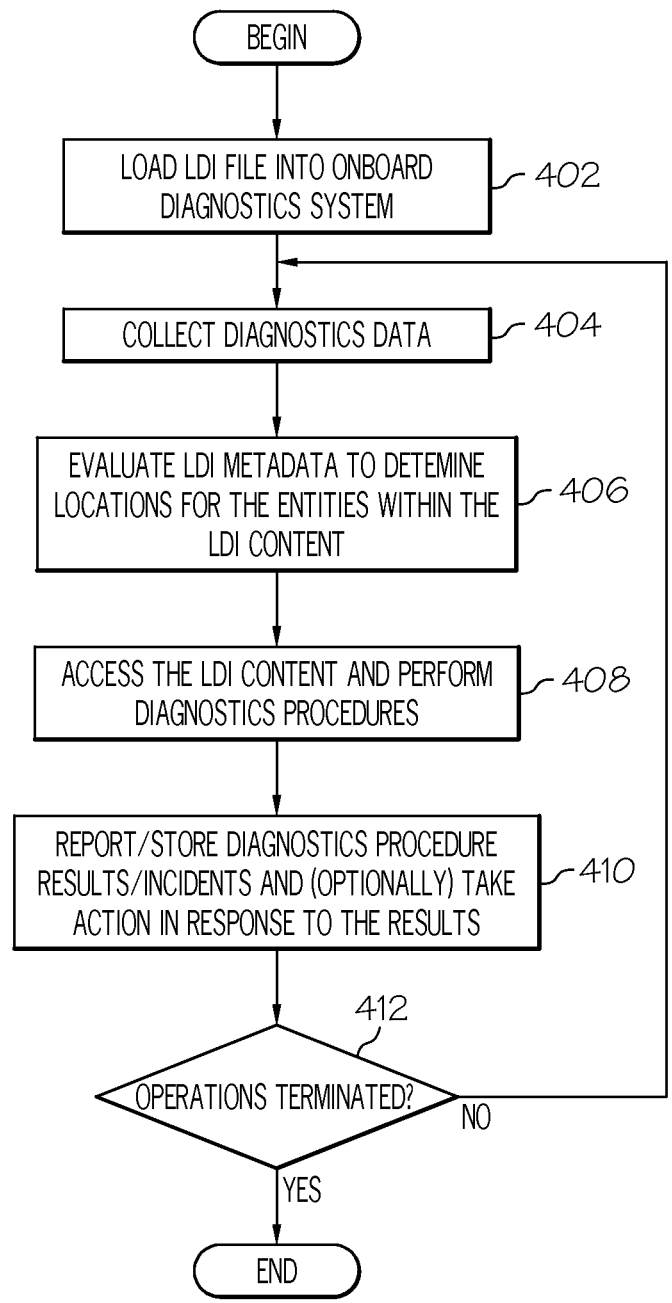
FIG. 4 illustrates a flowchart of a method for an onboard diagnostics system to access and use information within an LDI file for aircraft diagnostics, in accordance with an example embodiment.

FIG. 4 illustrates a flowchart of a method for an onboard diagnostics system (e.g., onboard diagnostics system 104, FIG. 1) to access and use information within an LDI file (e.g., LDI file 110, FIG. 1) for aircraft diagnostics, in accordance with an example embodiment. The method may begin, in block 402, when the LDI file is loaded into the onboard diagnostics system or otherwise made accessible to the system. This may be achieved, for example, by inserting a removable media that contains the LDI file into a removable media interface of the diagnostics system, downloading the LDI file into onboard memory accessible to the diagnostics system (e.g., onboard memory 116, FIG. 1), or otherwise making the LDI file accessible to the diagnostics system.

During operations of the aircraft, the onboard diagnostics system collects and stores diagnostics data, in block 404. The LDI file may be characterized as a read-only database, and the diagnostics data is stored in a different memory region from the LDI file, in an embodiment. In order to initiate evaluation of the diagnostics data, the LDI file is accessed by the LDI accessor module (e.g., LDI accessor module 118, FIG. 1). According to an embodiment, this includes retrieving and evaluating the LDI metadata in the LDI file, in block 406, to determine locations of the various entities, relationships, and/or attributes within the LDI content that is also included in the LDI file. As discussed previously, the LDI accessor module has a priori knowledge of the locality and accessibility of the LDI metadata within the LDI file. In block 408, the LDI accessor module accesses the various entities, relationships, and/or attributes using the structural definition of the LDI content conveyed within the LDI metadata. The onboard diagnostics system may then use the accessed entity-relationship models and collected diagnostics data to perform various diagnostics procedures. More particularly, the onboard diagnostics system may perform a diagnostics procedure by applying the collected diagnostics data to an entity-relationship model that is accessed from the LDI file.

In block 410, results of the diagnostics procedures and/or operational incidents detected in conjunction with the diagnostics procedures may be reported (e.g., to an onboard maintenance system) and stored for later access (e.g., by ground-based maintenance personnel). In certain cases, action may be taken in response to the results and detected incidents, although this is not a requirement. For example, operation of the aircraft may automatically be adjusted to enhance performance, and/or notifications or indicators may be provided to the aircraft crew (via user interfaces) that reflect the diagnostics procedure results.

The diagnostics data collection, LDI content access, and diagnostics procedure processes may continue until operations of the aircraft are terminated, as indicated by decision block 412. Upon termination of aircraft operations, the method ends. Diagnostics data, diagnostics procedure results, and detected incident information may thereafter be retrieved from onboard memory (e.g., onboard memory 116, FIG. 1) by ground-based maintenance personnel. This information may be used to determine which maintenance procedures may be performed on the aircraft in order to enhance performance or address maintenance issues.

Embodiments of methods and apparatus for generating binary files and accessing information therein have now been described. Implementations of such methods and apparatus may provide one or more advantages over traditional methods and apparatus. For example, in an embodiment implemented in an aircraft diagnostics system, the above described embodiments of the inventive subject matter enable LDI file structure information to be decoupled from the embedded software of an LDI accessor module (e.g., LDI accessor module 118, FIG. 1). Because the LDI accessor module is capable of retrieving and evaluating the LDI file structure metadata (rather than relying on embedded LDI file structure information in the LDI accessor module), the LDI accessor module is able to access LDI content from LDI files having various content structures without the need for an embedded software update, according to various embodiments. Accordingly, even when the structure of LDI content within an LDI file is changed, the embedded LDI accessor module code does not need to be updated, and the LDI accessor module does not need to be requalified. This expedites the implementation of LDI file structure modifications in the field, in addition to minimizing the time and monetary expenses related to such modifications.

The various embodiments described above have been described herein in terms of functional block components and various processing steps. It should be appreciated that such functional blocks may be realized by any number of hardware, firmware, and/or software components configured to perform the specified functions. While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment. It being understood that various changes may be made in the function and arrangement of elements described in an exemplary embodiment without departing from the scope of the inventive subject matter as set forth in the appended claims.

What is claimed is:

1. A method for an aircraft diagnostics system to access information within a binary file, the method comprising the steps of:
   evaluating, by a processor, metadata within a first partition of the binary file to determine a location within the binary file of an entity that is associated with one or more components of an aircraft;
   accessing, by a processor, the entity within a second partition of the binary file based on the location determined during the evaluating; and
   performing, by a processor, an aircraft diagnostics procedure on a system of the aircraft based on the entity.

2. The method of claim 1, wherein the entity forms a portion of loadable diagnostics information for use by the onboard aircraft diagnostics system.

3. The method of claim 1, wherein the entity forms a portion of an entity-relationship model of an aircraft system component.

4. The method of claim 3, wherein the entity-relationship model is an entity-relationship model of a line replaceable unit.

5. The method of claim 1, further comprising:
   collecting diagnostics data; and
   wherein the performing the diagnostics procedure comprises performing the diagnostics procedure by applying the diagnostics data to an entity-relationship model that includes the entity.

6. The method of claim 1, wherein evaluating the metadata comprises determining a location of the metadata within the binary file from a metadata locality definition stored in the aircraft diagnostics system.

7. The method of claim 1, wherein evaluating the metadata comprises determining how to access the metadata within the binary file from a metadata accessibility definition stored in the aircraft diagnostics system.

8. A method for generating a binary file, the method comprising the steps of:
   receiving, by a processor, content structure information;
   receiving, by a processor, information defining an entity that is associated with one or more components of an aircraft and that forms a portion of loadable diagnostics information;
   generating, by a processor, metadata defining a location within a binary file where the entity is to be located based on the content structure information; and
   generating, by a processor, the binary file to include the metadata in a first partition of the binary file and the entity stored at the location in a second partition of the binary file.

9. The method of claim 8, wherein the entity forms a portion of loadable diagnostics information for use by an onboard aircraft diagnostics system.

10. The method of claim 8, wherein the entity forms a portion of an entity-relationship model of an aircraft system component.

11. The method of claim 10, wherein the entity-relationship model is an entity-relationship model of a line replaceable unit.

12. A diagnostics system of an aircraft, the diagnostics system comprising:
    data storage configured to store a binary file that includes metadata and an entity that is associated with one or more components of the aircraft and that is stored at a location within the binary file, wherein the metadata defines the location of the entity and is stored in a first partition of the binary file, and wherein the entity is stored in a second partition of the binary file;
    an accessor module configured to evaluate the metadata to make a determination of the location, and to access the entity within the binary file based on the determination; and
    a diagnostic module configured to perform an aircraft diagnostics procedure based on the entity.

13. The diagnostics system of claim 12, wherein the data storage is further configured to store a metadata locality and accessibility definition that defines the location and structure of the metadata within the binary file, and wherein the accessor module accesses the metadata within the binary file in accordance with the metadata locality and accessibility definition.

14. The diagnostics system of claim 12, wherein the accessor module includes embedded metadata locality and accessibility definition that defines the location and structure of the metadata within the binary file, and wherein the accessor module accesses the metadata within the binary file in accordance with the embedded metadata locality and accessibility definition.

15. The diagnostics system of claim 12, wherein the entity forms a portion of an entity-relationship model of an aircraft system component.

16. The diagnostics system of claim 15, wherein the entity-relationship model is an entity-relationship model of a line replaceable unit.

17. The diagnostics system of claim 15, wherein the diagnostics system is configured to collect diagnostics data during operations of the aircraft, and wherein the diagnostics module is further configured to perform the diagnostics procedure by applying the diagnostics data to the entity-relationship model.

18. The diagnostics system of claim 17, wherein the diagnostics system is further configured to report results of the diagnostic procedure to an onboard maintenance system.

* * * * *